US005805109A

United States Patent [19]

Whiting

[11] Patent Number: 5,805,109

[45] Date of Patent: Sep. 8, 1998

[54] ANTENNA SYSTEM

[75] Inventor: Ian Gerald Whiting, Borne, Netherlands

[73] Assignee: Hollandse Signaalapparaten B.V., Hengelo, Netherlands

[21] Appl. No.: 755,595

[22] Filed: Nov. 25, 1996

Related U.S. Application Data

[63] Continuation of Ser. No. 326,956, Oct. 21, 1994, abandoned.

[30] Foreign Application Priority Data

Oct. 28, 1993 [NL] Netherlands ........................... 9301859

[51] Int. Cl.[6] ............................ H01Q 3/22; G01S 13/00; F41G 7/00

[52] U.S. Cl. ........................... 342/368; 342/62; 244/3.19

[58] Field of Search .................................... 342/368, 372, 342/62, 81; 244/3.19

[56] References Cited

U.S. PATENT DOCUMENTS

| | | | |
|---|---|---|---|
| 3,631,485 | 12/1971 | Beazell, Jr. | 342/62 |
| 3,729,150 | 4/1973 | Conger | 342/62 |
| 4,093,153 | 6/1978 | Bardash et al. | 244/3.14 |
| 4,100,545 | 7/1978 | Tabourier | 342/62 |
| 4,338,602 | 7/1982 | Roeder et al. | 342/62 |
| 4,348,679 | 9/1982 | Shnitkin et al. | 343/768 |

OTHER PUBLICATIONS

Barton, "Radar Guidance of Missiles", *Radars*, vol. 7, pp. 159–167 1978.

*Primary Examiner*—Gregory C. Issing
*Attorney, Agent, or Firm*—Oblon, Spivak, McClelland, Maier & Neustadt, P.C.

[57] ABSTRACT

The invention relates to a phased array antenna by means of which, besides normal radar transmissions, also a guidance of a number of semi-active homing missiles towards a number of targets can be effected. The main problem to be solved here is that a rear-reference signal for each missile remains present to a sufficient extent also during the periods covering normal radar transmissions. The invention solves this problem by transmitting rear-reference signals for all missiles deployed simultaneously with radar transmitter signals.

3 Claims, 1 Drawing Sheet

ANTENNA SYSTEM

This application is a Continuation of application Ser. No. 08/326,956, filed on Oct. 21, 1994, now abandoned.

BACKGROUND OF THE INVENTION

The invention relates to a phased array antenna system provided with a phased array antenna for generating a pencil beam and designed for realising radar transmissions.

Such radar apparatuses are used for target detection and tracking. If a target is to be engaged with a semi-active homing type of missile, this selected target is, according to the state of the art, illuminated by means of an illuminator which uninterruptedly transmits CW microwave radiation in the direction of the target.

If the operational requirements are such that a plurality of targets are to be simultaneously engaged, a number of illuminators equalling the number of targets shall be available. This renders the installation unduly expensive. In addition, the control of a number of scattered illuminators constitutes a major problem, in view of each illuminator having its individual parallax error and possible other errors, for instance resulting from torsional or bending forces applied to the ship's hull. Consequently it offers great attraction to use the phased array antenna system for this purpose.

SUMMARY OF THE INVENTION

The present invention is thereto characterised in that the phased array antenna system is also designed for the periodical illumination of selected targets for the guidance of missiles during their flight to the selected targets.

Although the missiles have been designed to operate with an uninterrupted CW illumination of the target, periodical illumination of the target has proven to be sufficient.

A problem which may be encountered in the event of a plurality of missiles being simultaneously deployed, is that the permissible duty cycle of the phased array antenna system is exceeded. Solutions to this problem depend on the type of phased array antenna to be used. For a passive phased array antenna system, the solution will generally imply the incorporation of an additional transmission system which enables the required duty cycle. For an active phased array antenna system, it is for instance possible to reduce the current and voltage of the solid-state module output stages, as is known from U.S. Pat. No. 5,155,492.

In addition to said target illumination, an illuminator is also capable of generating a CW reference signal for the missile during its flight to the selected target. This reference signal may be far weaker than the signal aimed at the selected target via the pencil beam, since the latter signal has experienced a two-way attenuation when it has reached the missile after having been reflected by the selected target. The reference signal, on the contrary, is only subject to a one-way attenuation. According to the state of the art, the reference signal is generated by suitably changing the illuminator antenna diagram.

The phased array antenna system according to the invention also requires the generation of a reference signal for the missiles during their flight. The invention is thereto characterised in that the phased array antenna system also comprises at least one auxiliary array for periodically transmitting reference signals for the missiles in flight. To this end, one or several additional auxiliary arrays may be included to be positioned near the phased array antenna, although it is also possible to designate a limited number of phased array elements constituting the phased array antenna to function as auxiliary arrays. Thus, the number of auxiliary arrays can be dynamically determined, depending on the operational conditions.

The auxiliary arrays may be arranged such as to yield an antenna diagram that points in the direction of selected missiles which are to be provided by said arrays with a reference signal. This is a relatively expensive solution. A possible embodiment of the phased array antenna system according to the invention is characterised in that the at least one auxiliary array has a relatively wide antenna diagram in the horizontal plane.

During the flight of a missile to the associated selected target, the reflections of the selected target originating from the periodical illumination of this target are processed by a missile-incorporated receiving system. At that moment, the reference signal acts as a local oscillator signal, well-known in the art, for the missile-incorporated receiving system. A favourable embodiment of the phased array antenna system is thereto characterised in that the reference signal for a missile has the same frequency as the signal generated by the phased array antenna for the periodical illumination of the associated selected target.

In a possible embodiment of the invention, the missile incorporates a local oscillator, designed as a phase locked loop, well-known in the art. This embodiment is known to offer more resistance to jammers. It is then essential for the reference signal to be present as long and as frequently as possible, since a so-called break lock of the phase locked loop, causing the local oscillator frequency to deviate from the frequency of the illumination signal reflected by the associated selected target, renders the missile vulnerable to jammers. In a favourable embodiment, the phased array antenna system according to the invention is thereto characterised in that the at least one auxiliary array substantially simultaneously transmits the reference signals whenever a selected target is illuminated.

Radar transmissions occurring between the periodical illuminations of the selected targets are unavoidable. As a rule, the targets are illuminated alternately, with a number of radar transmissions of a certain duration occurring between these illumination periods. During this period, a break lock of the phase locked loop of the missile might occur. An exceptionally favourable embodiment of the phased array antenna system according to the invention is thereto characterised in that the reference signals are also substantially simultaneously transmitted whenever the phased array antenna realizes a radar transmission.

BRIEF DESCRIPTION OF THE DRAWINGS

The invention will now be further explained with reference to the following figures, of which FIG. 1 schematically represents the phased array antenna system, a selected target and a missile.

DETAILED DESCRIPTION OF THE INVENTION

Figure 1A:
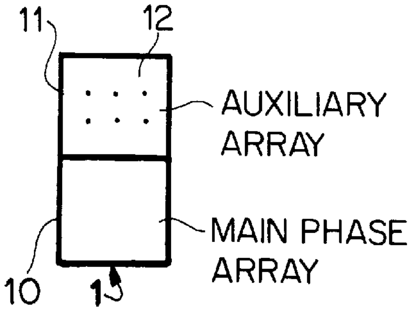
Figure 1B:
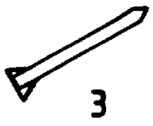
Figure 1C:
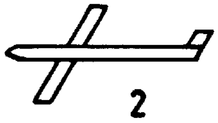
Figure 2:
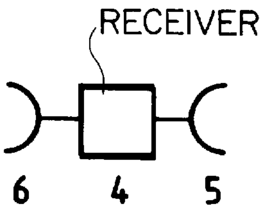
FIG. 2 represents a possible block diagram of the receiving system of the missile.

FIG. 1 schematically represents a phased array antenna system 1, having a main phase array 10 and an auxiliary array 11 with the auxiliary array 11 having a plurality of active phase array elements 12 a selected target 2 and a missile 3, describing a trajectory towards selected target 2. Missile 3 is arranged to be of the semi-active homing type. In this case, the selected target 2 is illuminated by antenna system 1 with microwave radiation having a certain frequency. The selected target 2 reflects a portion of the microwave radiation, another portion of which is received by a receiving system incorporated in the nose of missile 3. The receiving system is usually of the monopulse or conical scan type and is suitable for steering the control fins of missile 3 such that missile 3 is automatically guided towards selected target 2, all according to methods well-known in the art. Such a missile 3 is obviously highly vulnerable to jamming signals, particularly if these originate from selected target 2. Hence, the receiving system is usually of the type indicated in FIG. 2, the receiver 4, connected to for instance, a monopulse antenna 5, being provided with a reference signal, which is also transmitted by phased array antenna system 1 and which is received via an antenna 6 facing backwards. By using this reference signal as a local oscillator signal for receiver 4, the latter may be designed as a narrow-band receiver which consequently is highly jamming-insensitive.

Figure 3:
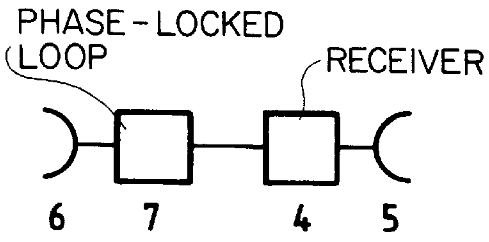
FIG. 3 represents a possible block diagram of a receiving system with a phase locked loop.

A further missile improvement well-known in the art is illustrated in FIG. 3; here the reference signal received via antenna 6 is not fed to receiver 4 directly, but via a phase locked loop 7. This entails the advantage that, if the reference signal briefly fades, a local oscillator signal for receiver 4 will nevertheless remain available. This reference signal fading for instance occurs as a result of destructive interference between a directly intercepted reference signal and a reference signal received via the earth surface. As for each phase locked loop, the prolonged fading results in a break lock, with the frequency of the local oscillator signal deviating from the frequency of the signal reflected by the relevant selected missile.

This renders a frequency search scan of the phase locked loop necessary in order to assume a locked state when the reference signal is again present. Particularly during this search scan the missile is susceptible to interference signals, which may be mistaken for reference signals.

Figure 4:
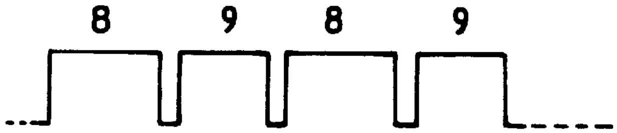
FIG. 4 represents a possible time-sequence diagram of the various transmissions.

The phased array antenna system according to the invention makes use of the existing missile structure illustrated in FIG. 3 for controlling a plurality of missiles on a time-sharing basis, as illustrated in FIG. 4. A series of radar transmissions 8 is followed by the illumination 9 of a target, after which another series of radar transmissions 8 occurs, followed by the illumination 9 of a subsequent target, etc. According to the invention, a target is continuously illuminated during illumination 9 and all missiles in flight are provided with a reference signal.

The duration of an illumination 9 has been selected in accordance with the specification pertaining to missile 3, in order to obtain a suitable track behaviour with regard to target 2 and can depend on the flight phase of missile 3 and of the type of target 2.

Since each missile operates at a different frequency in order to prevent mutual interference, reference signals having different frequencies shall also be transmitted. It is of minor importance, whether such is realized by means of a single auxiliary array or by means of an auxiliary array for each frequency. For an active phased array system, for which the invention may be advantageously applied, an auxiliary array will generally comprise a limited number of phased array modules. By means of these modules a desired antenna diagram for the auxiliary array can be realised. Generally, a relatively wide antenna diagram will be required, thus enabling the continuous illumination of all missiles, whereas in the vertical plane, the antenna diagram will be quite narrow and horizontally-oriented. This can advantageously be realised by stacking a number of modules, resulting in a substantially vertical auxiliary array. Whether one or more frequencies are transmitted with this auxiliary array will depend on the power generated by the auxiliary array. If this is sufficient to supply a reference signal to a maximum number of missiles determined on the basis of a scenario, the invention can be realised on the basis of a single auxiliary array. However, the phased array antenna often comprises several additional auxiliary arrays, for instance for sidelobe cancellation or sidelobe blanking purposes or for other ECCM techniques. These auxiliary arrays may be used for the transmission of the different reference signals. Apart from these additional auxiliary arrays, it is also possible to realise auxiliary arrays by pseudo-randomly designating a number of phased array antenna modules to function as auxiliary arrays by causing them to transmit reference signals. This entails the advantage that the allocation may be effected dynamically so as to limit the duty cycle of the allocated phased array elements.

Since the auxiliary arrays will practically continuously transmit radiant energy, special provisions will have to be made to prevent a maximum duty cycle from being exceeded.

For active phased array systems in which the auxiliary array is realised by a number of phased array modules, these provisions will usually entail the necessity to reduce the current and voltage of the solid-state module output stages.

By constantly alternating a series of radar transmissions 8 with illuminations 9 and by constantly providing all missiles in flight with a reference signal during illuminations 9, the risk of a break lock occurring is much reduced as compared with the situation in which a reference signal for a certain missile is present only during its illumination. A further improvement is based on the inventive principle that also during radar transmission, all reference signals may conveniently be transmitted simultaneously. In this respect it should be considered that said radar transmissions consist of transmission periods and subsequent receiving times. Reference signals can only be transmitted during said transmission periods to ensure an uninterrupted radar operation. For active phased array antenna systems having typically large duty cycles, the reference signals will be present to a sufficient extent to also prevent a break lock during a series of radar transmissions 8. Another possibility is to program a scheduler which is incorporated in phased array antenna system 1 and which, for instance, checks the duty cycles and target priorities in such a way that on the basis of known specifications of phase locked loop 7 in respect of the occurrence of a break lock during the fading of the reference signal, a break lock is always prevented.

I claim:

1. A phase array antenna system provided with a phased array antenna for generating a pencil beam, designed for realizing radar transmissions and for the periodical illumination of selected targets for the guidance of missiles during their flight towards the selected targets, wherein each selected target is illuminated with an individual RF frequency and wherein each missile on its way to a selected target is provided with a reference signal having a corresponding individual RF frequency, characterized in that the phase array antenna system comprises at least one auxiliary array for the transmission of all the reference signals for all the missiles in flight simultaneously, each time a selected target is illuminated and each time a radar transmission is realized.

2. Phased array antenna system as claimed in claim 1, characterized in that the at least one auxiliary array comprises a cluster of active phased array elements for realizing a desired antenna pattern, positioned near but separated from the phased array antenna.

3. Phased array antenna system as claimed in claim 1, characterized in that the phased array antenna is of the active type and that the auxiliary array comprises a number of phased array antenna elements allocated from the phased array antenna.

* * * * *